(12) United States Patent
Greene

(10) Patent No.: US 8,096,572 B1
(45) Date of Patent: Jan. 17, 2012

(54) GOOSENECK TRAILER HITCH ALIGNMENT SYSTEM

(76) Inventor: Lee E. Greene, Bandon, OR (US)

( * ) Notice: Subject to any disclaimer, the term of this patent is extended or adjusted under 35 U.S.C. 154(b) by 146 days.

(21) Appl. No.: 12/486,055

(22) Filed: Jun. 17, 2009

Related U.S. Application Data

(60) Provisional application No. 61/132,895, filed on Jun. 24, 2008.

(51) Int. Cl.
*B60D 1/06* (2006.01)
(52) U.S. Cl. .......................... 280/507; 280/477
(58) Field of Classification Search .......... 280/477, 280/511, 512, 513
See application file for complete search history.

(56) References Cited

U.S. PATENT DOCUMENTS

| | | | |
|---|---|---|---|
| 4,199,756 A | 4/1980 | Dito | |
| 5,454,582 A * | 10/1995 | Rines | 280/477 |
| 5,529,330 A | 6/1996 | Roman | |
| 5,758,893 A | 6/1998 | Schultz | |
| 5,821,852 A | 10/1998 | Fairchild | |
| 5,890,727 A | 4/1999 | May | |
| 5,909,892 A | 6/1999 | Richardson | |
| 6,179,318 B1 | 1/2001 | Howard | |
| 6,199,890 B1 | 3/2001 | Lindenman et al. | |
| 6,454,290 B1 | 9/2002 | Turner | |
| 6,464,241 B1 | 10/2002 | Daniel | |
| 6,796,573 B2 * | 9/2004 | Beaudoin | 280/477 |
| 6,834,878 B2 | 12/2004 | Koestler | |
| 7,131,658 B2 * | 11/2006 | MacKarvich | 280/477 |
| 2002/0100175 A1 | 8/2002 | King | |
| 2002/0125685 A1 | 9/2002 | White | |
| 2004/0217576 A1 | 11/2004 | Fox | |
| 2006/0108771 A1 | 5/2006 | Elkins et al. | |
| 2006/0261574 A1 | 11/2006 | Milner et al. | |
| 2006/0273549 A1 | 12/2006 | Dietz | |

* cited by examiner

*Primary Examiner* — Kevin Hurley
(74) *Attorney, Agent, or Firm* — Jerry Haynes Law

(57) ABSTRACT

A gooseneck trailer alignment system includes a hitch receptacle having a receptacle opening, a trailer guide plate positional beneath the receptacle opening and a plate notch provided in the trailer guide plate.

19 Claims, 4 Drawing Sheets

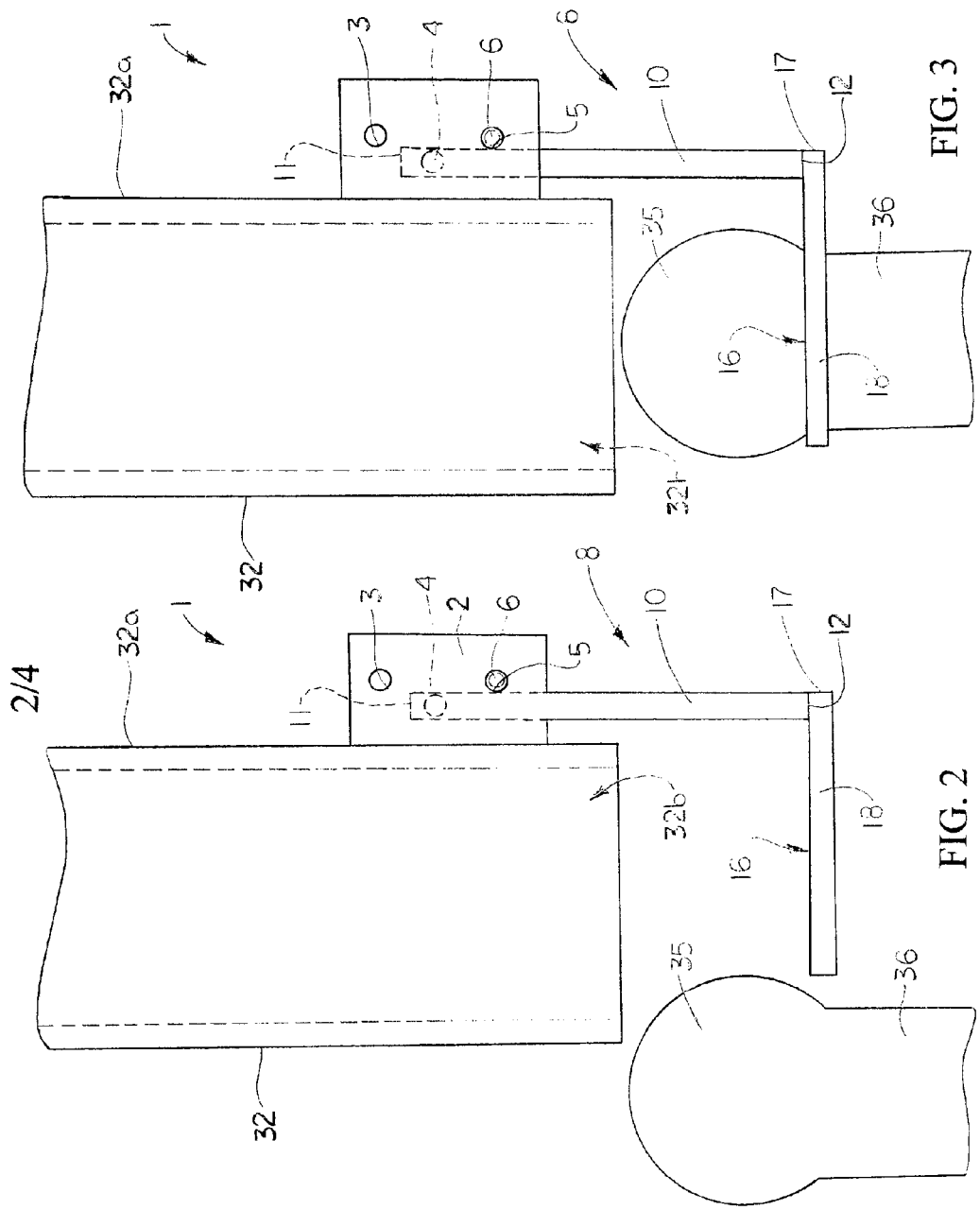

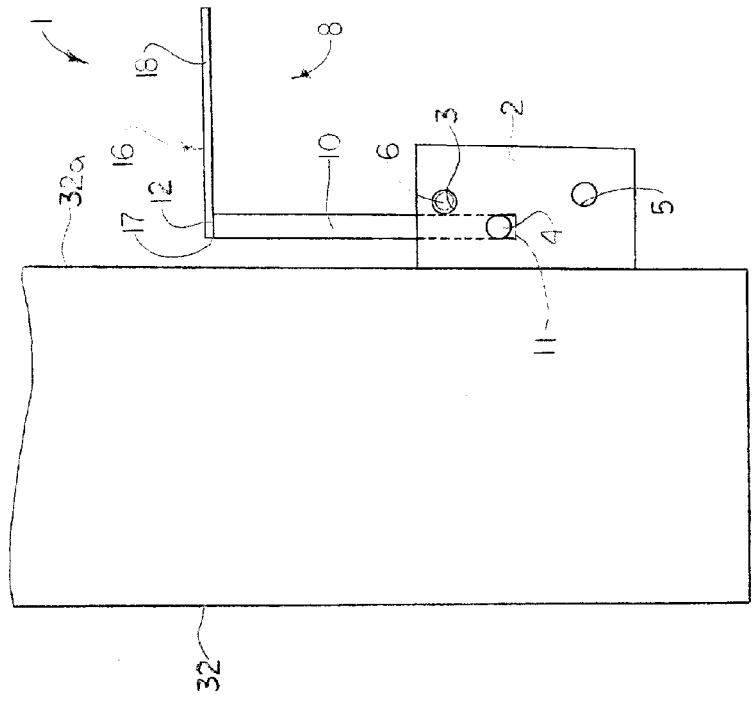
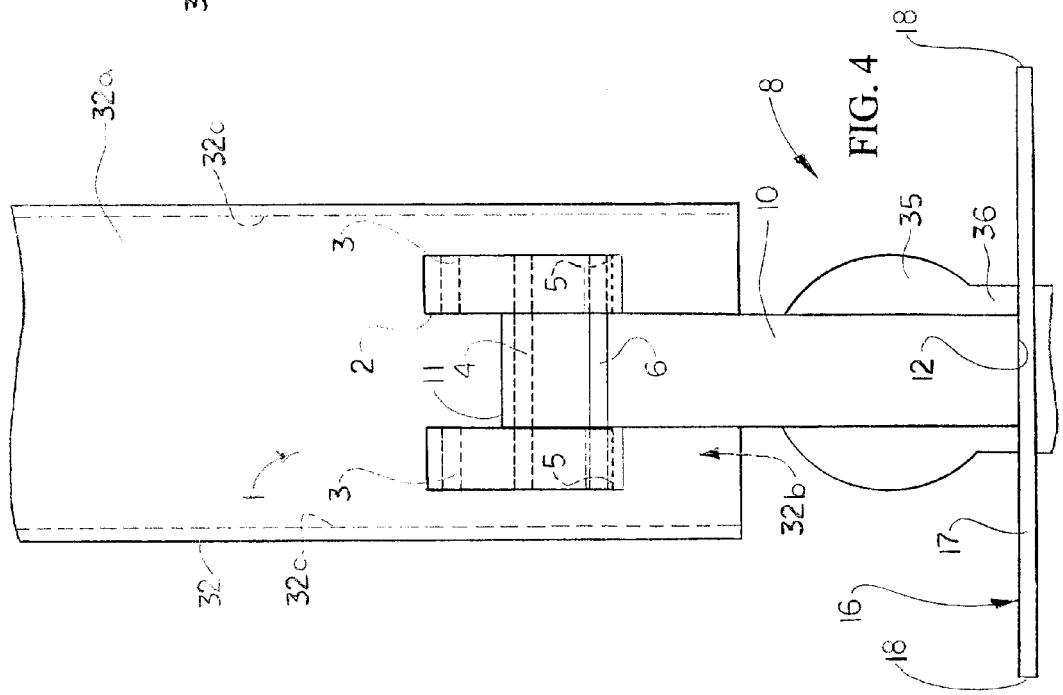

GOOSENECK TRAILER HITCH ALIGNMENT SYSTEM

CROSS-REFERENCE TO RELATED APPLICATIONS

This application claims the benefit of and incorporates by reference in its entirety U.S. provisional application No. 61/132,895, filed Jun. 24, 2008 and entitled "Gooseneck Trailer Hitch Alignment System".

FIELD OF THE INVENTION

The present disclosure generally relates to trailer hitch alignment systems. More particularly, the present disclosure generally relates to a trailer hitch alignment system which is suitable for aligning a gooseneck hitch receiver on a trailer with a hitch element on a towing vehicle.

BACKGROUND OF THE INVENTION

Towing vehicles such as trucks and SUVs are frequently used to tow trailers on which are supported recreational vehicles, boats, campers or the like. Hitches of various designs may be used to couple the trailer to the towing vehicle. A common type of hitch which is used for the purpose is the gooseneck hitch, which includes a vertical hitch receptacle that is adapted to receive a hitch element such as a hitch ball provided on the towing vehicle.

One of the challenges frequently encountered in coupling a gooseneck hitch to a towing vehicle is that of precisely aligning the hitch ball on the vehicle with the hitch receptacle on the gooseneck hitch of the trailer. This alignment process may require much trial and error in which the driver of the towing vehicle repeatedly adjusts the position of the hitch ball with respect to the hitch receptacle by slowly reversing the vehicle and repeatedly stopping and exiting the vehicle to determine the new location of the hitch ball with respect to the hitch receptacle after each adjustment until the hitch ball is ultimately located beneath the hitch receptacle. The hitch receptacle is then lowered to receive the hitch ball and couple the trailer to the vehicle.

Accordingly, a trailer hitch alignment system which facilitates expeditious alignment of a hitch ball or other hitch element on a towing vehicle with a hitch receptacle on a gooseneck hitch provided on a trailer is needed.

SUMMARY OF THE INVENTION

The present disclosure is generally directed to a gooseneck trailer hitch alignment system. An illustrative embodiment of the gooseneck trailer alignment system includes a hitch receptacle having a receptacle opening, a trailer guide plate positional beneath the receptacle opening and a plate notch provided in the trailer guide plate.

BRIEF DESCRIPTION OF THE DRAWINGS

The disclosure will now be made, by way of example, with reference to the accompanying drawings, in which:

FIG. 2 is a side view of an illustrative embodiment of the gooseneck trailer hitch alignment system, mounted on a hitch receiver (partially in section) of a gooseneck trailer, as a trailer guide plate of the system approaches a hitch ball (partially in section) on a towing vehicle (not illustrated) in implementation of the system;

FIG. 3 is a side view of an illustrative embodiment of the gooseneck trailer hitch alignment system, mounted on the hitch receiver of the gooseneck trailer (partially in section) with the trailer guide plate of the system engaging the hitch ball (partially in section) on the trailer in implementation of the system;

FIG. 4 is a front view of an illustrative embodiment of the gooseneck trailer hitch alignment system with the trailer guide plate disposed in alignment with the hitch ball (partially in section) on the towing vehicle;

FIG. 5 is a side view of an illustrative embodiment of the gooseneck trailer hitch alignment system, mounted on a hitch receiver (partially in section) of a gooseneck trailer, more particularly illustrating the trailer alignment arm and trailer guide plate of the system deployed in a storage position when the system is not in use.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
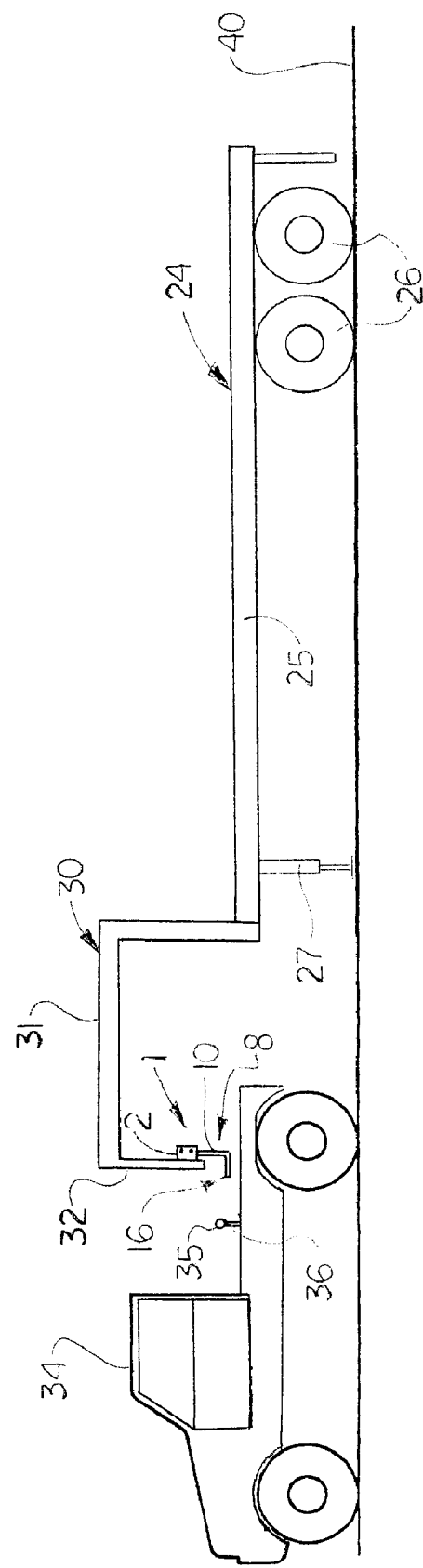
FIG. 1 is a side view of a towing vehicle and a flatbed trailer fitted with a gooseneck hitch preparatory to coupling of the trailer to the vehicle in implementation of an illustrative embodiment of the gooseneck trailer hitch alignment system.

Referring to the drawings, an illustrative embodiment of the gooseneck trailer hitch alignment system, hereinafter system, is generally indicated by reference numeral 1. As illustrated in FIG. 1 and will be hereinafter described, the system 1 is adapted to facilitate expeditious alignment of a hitch ball 35 or other hitch element on a towing vehicle 34 with a hitch receptacle 31 of a gooseneck hitch 30 which is provided on a trailer 24 as the towing vehicle 34 is maneuvered in reverse toward the trailer 24. The system 1 facilitates positioning of the hitch ball 35 beneath the hitch receptacle 31 such that the hitch receptacle 31 can subsequently be lowered in place over the hitch ball 35 to couple the trailer 24 to the towing vehicle 34.

As illustrated in FIG. 1, in some embodiments the trailer 24 may be a flatbed trailer having an elongated trailer bed 25 which may be fitted with tandem sets of trailer wheels 26. A height-adjustable trailer jack 27 of selected design may be fitted to the front end of the trailer bed 25 to support the front end of the trailer 24 over a supporting surface 40 during coupling and uncoupling of the trailer 24 to the towing vehicle 34. The gooseneck hitch 30 includes a hitch frame 31 which may extend forwardly from a front end of the trailer bed 25, and the hitch receptacle 32 extends downwardly from the hitch frame 31.

As illustrated in FIGS. 2 and 3, the hitch receptacle 32 has a rear surface 32a which generally faces the rear of the trailer 24 and a receptacle opening 32b (illustrated in phantom) which is adapted to receive the hitch ball 35 on the towing vehicle 34. The trailer bed 25 of the trailer 24 may be adapted to support cargo (not illustrated) such as pipes, lumber, machinery or vehicles, for example and without limitation. In other embodiments, the trailer 24 may have alternative designs known by those skilled in the art and may be configured and adapted to support one or more recreational vehicles (not illustrated), a boat (not illustrated), a camper (not illustrated) or the like, or animals (not illustrated) such as horses, for example and without limitation.

As further illustrated in FIG. 1, in some applications the towing vehicle 34 may be a flatbed truck, as illustrated. In other applications, the towing vehicle 34 may be an SUV or a pickup truck, for example and without limitation. The hitch ball 35 may be provided on a vertical hitch ball support 36 which extends from the towing vehicle 34.

Figure 6:
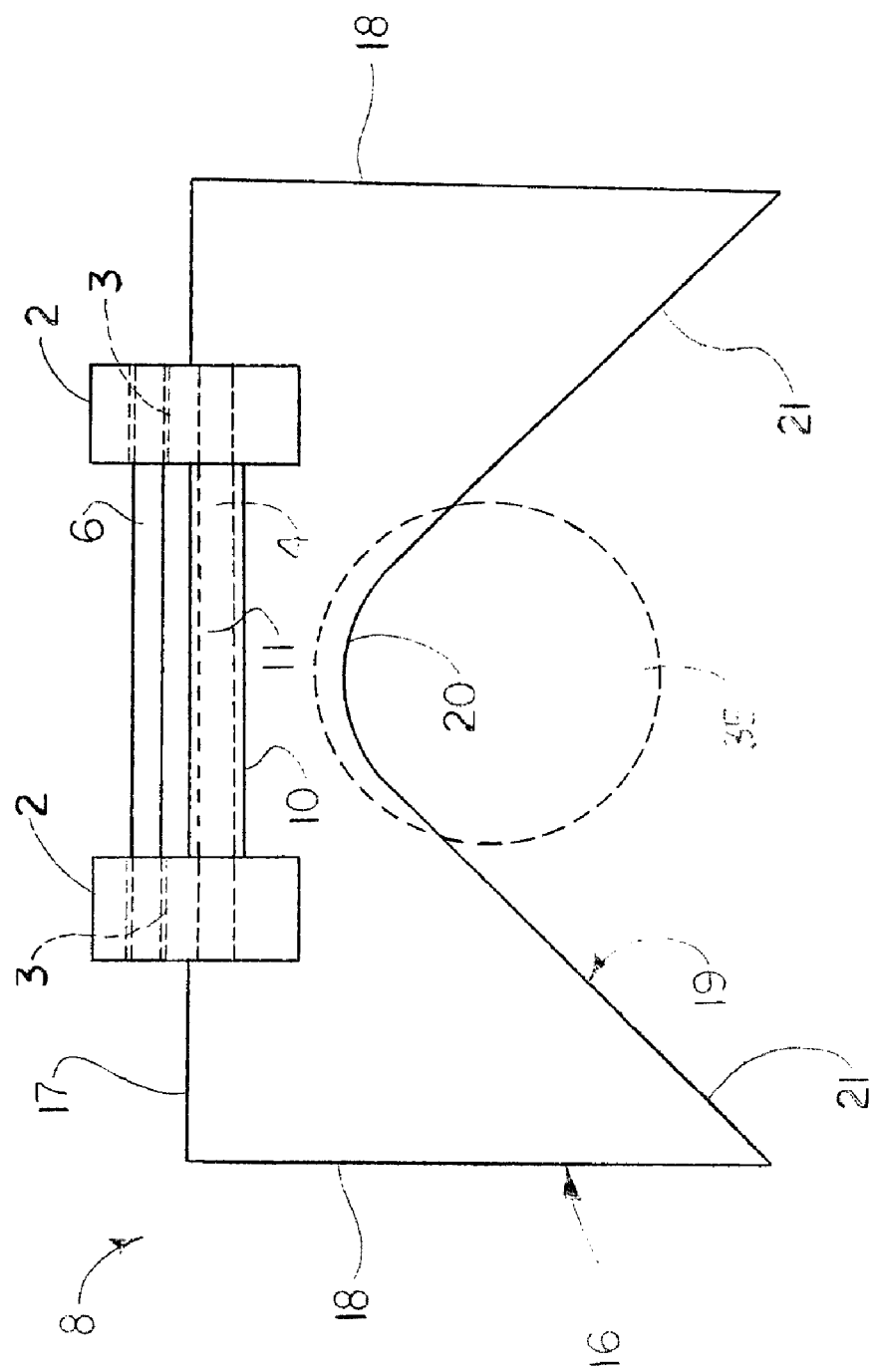
FIG. 6 is a top view of an illustrative embodiment of the gooseneck trailer hitch alignment system, with the hitch ball (in phantom) aligned with a plate notch provided in the trailer guide plate of the system.

The system 1 includes a trailer alignment assembly 8 which may be provided on the hitch receptacle 32 of the gooseneck hitch 30. The trailer alignment assembly 8 includes a trailer guide plate 16 which is capable of being positioned beneath the receptacle opening 32b (FIG. 2) of the hitch receptacle 32 such as in a manner which will be hereinafter described. As illustrated in FIG. 4, when it is positioned beneath the receptacle opening 32b, the trailer guide plate 16 may be centered with respect to the hitch receptacle 32. As illustrated in FIG. 6, the trailer guide plate 16 may include a transverse plate edge 17 and a pair of generally parallel, spaced-apart side plate edges 18 which extend from the transverse plate edge 17. A plate notch 19 may extend into the trailer guide plate 16 between the plate side edges 18 and toward the transverse plate edge 17. The plate notch 19 may include a central notch apex 20 which is substantially equidistant between the side plate edges 18 and a pair of hitch guide surfaces 21 which extend outwardly from the notch apex 20 to the respective plate side edges 18. Each hitch guide surface 21 of the plate notch 19 may be elongated and straight and oriented at an acute angle with respect to the corresponding plate side edge 18. The notch apex 20 of the plate notch 19 may be suitably sized and configured to receive the hitch ball support 36 generally at the junction of the hitch ball 35 with the hitch ball support 36. When the trailer guide plate 16 is positioned beneath the receptacle opening 32b of the hitch receptacle 32, the notch apex 20 of the plate notch 19 is disposed in alignment with the receptacle opening 32b. As illustrated in FIG. 4, the hitch guide surfaces 21 (FIG. 6) of the plate notch 19 may extend beyond the lateral limits 32c of the receptacle opening 32b.

The trailer guide plate 16 of the trailer alignment assembly 8 may be attached to the hitch receptacle 32 of the gooseneck hitch 30 according to any suitable mechanism which is known by those skilled in the art. As illustrated in FIGS. 2-5, in some embodiments a pair of arm mount flanges 2 extends from the rear surface 32a of the hitch receptacle 32 in generally parallel, spaced-apart relationship with respect to each other. A generally elongated trailer alignment arm 10 has a proximal arm end 11 which is pivotally mounted between the arm mount flanges 2 such as via a pivot pin 4 and a distal arm end 12 which is spaced-apart from the proximal arm end 11. The trailer guide plate 16 of the trailer alignment assembly 8 is provided on the distal arm end 12 of the trailer alignment arm 10. As illustrated in FIGS. 2 and 3, the distal arm end 12 of the trailer alignment arm 10 may be welded, fastened and/or otherwise attached to the trailer guide plate 16 generally at or adjacent to the transverse plate edge 17 of the trailer guide plate 16. The trailer guide plate 16 may be oriented in generally perpendicular relationship with respect to the trailer alignment arm 10.

The trailer alignment arm 10 and the trailer guide plate 16 may be selectively positional between the downwardly-extended operational position illustrated in FIGS. 2-4, in which the trailer guide plate 16 is positioned beneath the receptacle opening 32b of the hitch receptacle 32, as illustrated in FIGS. 2 and 3, and the upwardly-extended storage position illustrated in FIG. 5. As further illustrated in FIGS. 2-5, a pair of operating position pin openings 5 may extend transversely through the respective arm mount flanges 2 in aligned or registering relationship with respect to each other. As illustrated in FIGS. 2-4, a lock pin 6 may be selectively extended through the pair of operating position pin openings 5 to retain the trailer alignment assembly 8 in the operational position. A pair of storage position pin openings 3 may also extend transversely through the respective arm mount flanges 2 in aligned or registering relationship with respect to each other. The lock pin 6 may be removed from the operating position pin openings 5 and the trailer alignment assembly 8 pivoted from the operational position illustrated in FIGS. 2-4 to the storage position illustrated in FIG. 5 and retained in the storage position by removing the lock pin 6 from the operating position pin openings 5 and inserting the lock pin 6 through the storage position pin openings 3.

In typical application of the system 1, the trailer jack 27 (FIG. 1) extends downwardly from the front end of the trailer bed 25 of the trailer 24 and supports the gooseneck hitch 30 over the ground or other supporting surface 40. The trailer alignment assembly 8 of the system 1 may be repositioned from the storage position illustrated in FIG. 5 to the lowered or operational position illustrated in FIGS. 2-4 such as by removing the lock pin 6 from the storage position pin opening 3 in the arm mount flanges 2 and pivoting the trailer alignment arm 10 downwardly to the operational position along the pivot pin 4. Accordingly, the trailer alignment arm 10 of the trailer alignment assembly 8 suspends or supports the trailer guide plate 16 beneath the receptacle opening 32b of the hitch receptacle 32, as illustrated in FIGS. 2 and 3. The trailer alignment assembly 8 may be selectively locked or secured in the operational position by extending the lock pin 6 through the operating position pin openings 5 in the respective arm mount flanges 2.

The towing vehicle 34 (FIG. 1) is next operated in reverse to move the hitch ball 35 on the towing vehicle 34 toward the trailer alignment assembly 8 on the stationary hitch receptacle 32 and ultimately beneath the hitch receptacle 32. As it approaches the trailer guide plate 16, the hitch ball 35 may eventually engage one of the angled hitch guide surfaces 21 (FIG. 6) of the trailer guide plate 16. Continued rearward movement of the hitch ball 35 causes the angled hitch guide surface 21 to guide the hitch ball 35 into the notch apex 20 of the plate notch 19. As illustrated in FIG. 4, when the hitch ball 35 is located in the notch apex 20 of the plate notch 19, the receptacle opening 32b of the hitch receptacle 32 is located above and in alignment with the hitch ball 35. As illustrated in FIG. 6, depending on the width of the trailer guide plate 16 and thus, the width of the plate notch 19, the hitch guide surfaces 21 of the plate notch 19 may extend far beyond respective sides of the hitch ball 35. Therefore, the operator of the towing vehicle 34 has a large degree of latitude in positioning the hitch ball 35 to the right or left of the notch apex 20 as the towing vehicle 34 is backed toward the trailer guide plate 16 and need not maintain precise alignment of the hitch ball 35 with the notch apex 20 as the hitch ball 35 approaches the hitch receptacle 32 since either of the hitch guide surfaces 21 will ultimately guide the hitch ball 35 into the notch apex 20 as the towing vehicle 34 is backed toward the trailer alignment assembly 8.

By retraction of the trailer jack 27 (FIG. 1), the front end of the trailer 24, along with the gooseneck hitch 30, is next lowered until the hitch receptacle 32 receives the hitch ball 35. Additional coupling procedures, such as attachment of towing chains (not illustrated) between the trailer 24 and the towing vehicle 34, may be performed to complete coupling of the trailer 24 to the towing vehicle 34.

While the illustrative embodiments of the disclosure have been described above, it will be recognized and understood that various modifications can be made in the disclosure and the appended claims are intended to cover all such modifications which may fall within the spirit and scope of the disclosure.

What is claimed is:

1. A gooseneck trailer hitch alignment system for hitching a gooseneck trailer hitch to a hitch ball, comprising:
    a hitch receptacle having a receptacle opening;
    a trailer guide plate positional beneath the receptacle opening; and
    a plate notch provided in the trailer guide plate, the plate notch being centered with respect to the receptacle opening, wherein a trailer hitch ball is positioned below the receptacle opening when a hitch ball support is in contact with the plate notch;
    a trailer alignment arm pivotally carried by the hitch receptacle and wherein the trailer guide plate is carried by the trailer alignment arm; and
    a pair of angled guide surfaces provided on the trailer guide plate, the angled guide surfaces extending from the plate notch both forward and to the side with respect to the rear of the trailer, wherein as a hitch ball support engages a one of the angled surfaces the angled surface is angled to guide the hitch ball support toward the plate notch.

2. The system of claim 1 wherein the trailer guide plate comprises a transverse plate edge and a pair of parallel, spaced-apart side plate edges extending from the transverse plate edge, and wherein the plate notch extends between the side plate edges toward the transverse plate edge.

3. The system of claim 2 wherein the plate notch comprises a notch apex aligned with the receptacle opening and the pair of angled hitch guide surfaces extending from the notch apex.

4. The system of claim 1 wherein the trailer guide plate is positional between an operational position beneath the receptacle opening and a storage position.

5. The system of claim 1 wherein the trailer guide plate is perpendicular with respect to the trailer alignment arm.

6. The system of claim 5 wherein the trailer guide plate comprises a transverse plate edge and a pair of parallel, spaced-apart side plate edges extending from the transverse plate edge, and wherein the plate notch extends between the side plate edges toward the transverse plate edge and the trailer guide plate is attached to the trailer alignment arm generally at the transverse plate edge.

7. The system of claim 6 wherein the trailer guide plate is positional between an operational position beneath the receptacle opening and a storage position, and wherein the plate notch comprises a notch apex aligned with the receptacle opening when the trailer guide plate is in the operational position and a pair of angled hitch guide surfaces extending from respective sides of the notch apex.

8. A gooseneck trailer hitch alignment system for hitching a gooseneck trailer hitch to a hitch ball, comprising:
    a hitch receptacle having a receptacle opening;
    a trailer alignment assembly comprising:
        a trailer alignment arm having a proximal arm end pivotally carried by the hitch receptacle and a distal arm end spaced-apart from the proximal arm end;
        a trailer guide plate carried by the trailer alignment arm and positional beneath the receptacle opening of the hitch receptacle; and
        a plate notch provided in the trailer guide plate, the plate notch being centered with respect to the receptacle opening, wherein a trailer hitch ball is positioned below the receptacle opening when a hitch ball support is in contact with the plate notch; and
    a pair of angled guide surfaces provided on the trailer guide plate, the angled guide surfaces extending from the plate notch both forward and to the side with respect to the rear of the trailer, wherein as a hitch ball support engages a one of the angled surfaces the angled surface is angled to guide the hitch ball support toward the plate notch.

9. The system of claim 8 wherein the trailer guide plate is carried by the distal arm end of the trailer alignment arm.

10. The system of claim 8 wherein the trailer guide plate comprises a transverse plate edge and a pair of parallel, spaced-apart side plate edges extending from the transverse plate edge, and wherein the plate notch extends between the side plate edges toward the transverse plate edge.

11. The system of claim 10 wherein the plate notch comprises a notch apex aligned with the receptacle opening and the pair of angled hitch guide surfaces extending from the notch apex.

12. The system of claim 8 wherein the trailer guide plate is positional between an operational position beneath the receptacle opening and a storage position.

13. The system of claim 8 wherein the trailer guide plate is perpendicular with respect to the trailer alignment arm.

14. The system of claim 13 wherein the trailer guide plate comprises a transverse plate edge and a pair of parallel, spaced-apart side plate edges extending from the transverse plate edge, and wherein the plate notch extends between the side plate edges toward the transverse plate edge and the trailer guide plate is attached to the trailer alignment arm generally at the transverse plate edge.

15. The system of claim 14 wherein the trailer guide plate is positional between an operational position beneath the receptacle opening and a storage position, and wherein the plate notch comprises a notch apex aligned with the receptacle opening when the trailer guide plate is in the operational position and a pair of angled hitch guide surfaces extending from respective sides of the notch apex.

16. A gooseneck trailer hitch alignment system, comprising:
    a hitch receptacle having a receptacle opening;
    a trailer alignment assembly comprising:
        a trailer alignment arm having a proximal arm end pivotally carried by the hitch receptacle and a distal arm end spaced-apart from the proximal arm end;
        a trailer guide plate carried by the distal arm end of the trailer alignment arm and having a transverse plate edge and a pair of generally parallel, spaced-apart side plate edges extending from the transverse plate edge; and
        a plate notch provided in the trailer guide plate and having a notch apex substantially equidistant between the side plate edges and a pair of elongated hitch guide surfaces extending from the notch apex to the side plate edges, respectively;
    wherein the trailer alignment assembly is positional between an operational position wherein the plate notch is disposed beneath the receptacle opening of the hitch receptacle and the notch apex is aligned with the receptacle opening and a storage position wherein the trailer alignment arm and the trailer guide plate are generally adjacent to the hitch receptacle; and wherein the hitch guide surfaces of the plate notch extend beyond lateral limits of the receptacle opening.

17. The system of claim 16 further comprising a pair of spaced-apart arm mount flanges carried by the hitch receptacle and wherein the proximal arm end of the trailer alignment arm is pivotally mounted between the arm mount flanges.

18. The system of claim 17 further comprising a pair of operating position pin openings provided in the arm mount flanges, respectively, and a lock pin extendable through the operating position pin openings to secure the trailer alignment assembly in the operational position.

19. The system of claim 18 further comprising a pair of storage position pin openings provided in the arm mount flanges, respectively, and wherein the lock pin is extendable through the storage position pin openings to secure the trailer alignment assembly in the storage position.

* * * * *